United States Patent
Breen et al.

(10) Patent No.: US 6,928,568 B2
(45) Date of Patent: Aug. 9, 2005

(54) BATTERY CHARGER CURRENT LIMITING BASED ON MAXIMUM CURRENT CAPACITY OF AC ADAPTER AS DETERMINED BY ADAPTER IDENTIFICATION SUBSYSTEM

(75) Inventors: John J. Breen, Harker Heights, TX (US); Stacy A. Gower, Leander, TX (US); Brent A. McDonald, Round Rock, TX (US); Ayedin Nikazm, Austin, TX (US); Richard M. Tonry, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 569 days.

(21) Appl. No.: 10/077,468

(22) Filed: Feb. 15, 2002

(65) Prior Publication Data

US 2003/0159073 A1 Aug. 21, 2003

(51) Int. Cl.[7] .................................. G06F 1/26
(52) U.S. Cl. ........................ 713/340; 320/162
(58) Field of Search ........................ 320/162; 713/340

(56) References Cited

U.S. PATENT DOCUMENTS

| | | | | |
|---|---|---|---|---|
| 5,162,721 A | * | 11/1992 | Sato | 320/106 |
| 5,532,524 A | * | 7/1996 | Townsley et al. | 307/64 |
| 5,739,667 A | * | 4/1998 | Matsuda et al. | 320/128 |
| 5,986,437 A | * | 11/1999 | Lee | 320/162 |
| 6,035,357 A | * | 3/2000 | Sakaki | 710/301 |
| 6,498,957 B1 | * | 12/2002 | Umetsu | 700/22 |
| 6,795,302 B2 | * | 9/2004 | Kluth et al. | 361/679 |

* cited by examiner

*Primary Examiner*—Thomas Lee
*Assistant Examiner*—Albert Wang
(74) *Attorney, Agent, or Firm*—Baker Botts L.L.P.

(57) ABSTRACT

An information handling system comprising a processor, a battery to provide power to the information handling system, an AC adapter input port coupled to the battery configured to receive an AC adapter, and a battery charger coupled to the battery and the AC adapter input port configured to identify a characteristic of the AC adapter and adjust a battery charge current based upon the characteristic. The battery charger comprises an adapter identification subsystem coupled to the AC adapter input port configured to identify the characteristic and provide an adjustment current, and an adjustable charger coupled to the adapter identification subsystem and the battery, configured to set the battery charging current based upon the adjustment current. The AC adapter identification subsystem comprises an adapter identification circuit coupled to the AC adapter input port configured to identify the characteristic, and a microcontroller configured to provide the adjustment current to the adjustable charger.

9 Claims, 5 Drawing Sheets

BATTERY CHARGER CURRENT LIMITING BASED ON MAXIMUM CURRENT CAPACITY OF AC ADAPTER AS DETERMINED BY ADAPTER IDENTIFICATION SUBSYSTEM

BACKGROUND OF THE INVENTION

1. Field of the Invention

This invention relates generally to the field of battery charging devices, and more particularly to those battery charging devices that also supply power to additional electrical loads.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, and portable systems.

Portable information handling systems may be powered by an AC/DC power adapter (hereinafter "AC adapter") and/or a battery. In order to receive power from the battery, however, it must be sufficiently charged. Currently, battery chargers exist within portable information handling systems which are capable of charging a battery whether or not the information handling system is in use. For example, if the information handling system is coupled to an AC adapter but turned off, then the power from the AC adapter may be used to charge the battery. Additionally, if the information handling system is in use and coupled to an AC adapter, the battery charger may channel excess power not being used by the information handling system to charge the battery. This dynamic charging capability is achieved by setting a static maximum limit for the current capacity of the AC adapter (i.e. the power rating of the AC adapter) within the battery charger and measuring the current used by the system. Any difference between the system current and the static maximum current is then channeled to charge the batteries.

However, this method of dynamic charging works only for systems having fixed wattage AC adapters with known maximum current capabilities. If the portable information handling system that is being powered by the battery is capable of operating with more than a single, fixed wattage AC adapter, it is possible that too much current may be drawn from a lower rated AC adapter if the static maximum limit set in the battery charger does not accurately reflect the true power capabilities of the AC adapter. This scenario may lead to AC-DC latch off and possible data loss.

A similar problem may result when the information handling system is running in a high current demand mode in which the system takes a large percentage of the AC adapter's rated power. In such a case, the AC adapter may try to source more current than it is rated for. This may lead to heating of the AC adapter which may result in AC-DC latch off and possible data loss.

Additionally, vendors may provide portable information handling systems with each having different computing capabilities and current demands. In order to provide power to the systems in a way that is cost effective to both the buyer and the vendor, the vendor may supply only a few adapters for use with the systems. Unfortunately, not all power adapters may be used safely with the information handling systems since each system may have a different static max current setting.

For the foregoing reasons, there is a need for a method and apparatus to dynamically detect the type of AC adapter coupled to an information handling system and then adjust the battery charging current so that it is maximized.

SUMMARY OF THE INVENTION

An object of the present invention is generally to provide a portable information handling system having a processor, a battery, and battery charger for identifying a characteristic of an AC adapter coupled to the information handling system and setting a battery charge current based thereon.

In order to achieve the foregoing and other objects, one embodiment of the present invention provides an information handling system including a processor, a battery, an AC adapter coupled to an AC adapter input port of the information handling system, and a battery charger coupled to the AC adapter input port and the battery to identify the AC adapter and set a battery charge current according to properties of the AC adapter.

In another embodiment of the present invention, a battery charger is provided including an adapter identification subsystem configured to identify the AC adapter, and an adjustable charger coupled to the adapter identification subsystem to set a battery charge current based upon the properties of the AC adapter.

In yet another embodiment of the present invention, a method of charging a battery is provided including identifying the properties of an AC adapter coupled to a portable information handling system, and set a battery charge current based upon the identified properties.

The advantages of these and other embodiments, which are described below, may include providing for the safe use of one of multiple AC adapters to provide current to the portable information handling system, maximizing the current drawn from an AC adapter to charge a battery without damaging the AC adapter, and decreasing the charge time of the battery.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The use of the same reference symbols in different drawings indicates similar or identical items.

DETAILED DESCRIPTION OF THE INVENTION

The present invention is generally directed to charging a battery based upon properties of an AC adapter. In some embodiments, the present invention may be implemented in an information handling system.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
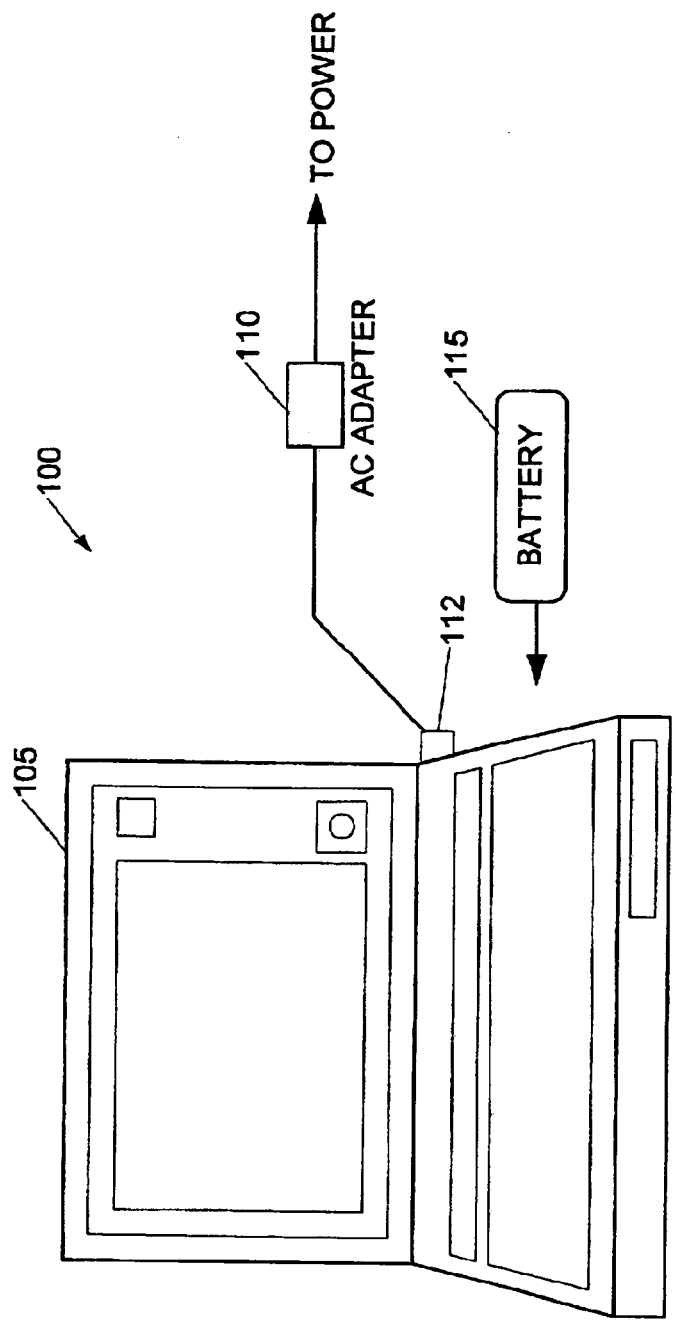
FIG. 1 illustrates a portable information handling system incorporating the present invention.

Turning now to the figures, FIG. 1 illustrates one type of information handling system, a portable information handling system (e.g. a laptop computer, a tablet, a personal digital assistant, a cellular phone, or other portable information handling system being capable of receiving power from a battery), for use with an embodiment of the present invention. Portable information handling system 105 is coupled to AC adapter 110, which is coupled to a power source (not shown). AC adapter 110 is coupled to portable information handling system 105 via AC adapter input port 112. AC adapter input port 112 may extend outside of portable information handling system 105 as shown, or alternatively, may be recessed within the portable information handling system 105. Portable information handling system 105 includes battery 115 which, when coupled to portable information handling system 105, can be used to provide power. AC adapter 110 converts AC power into DC power that can be used to power portable information handling system 105, and/or to charge battery 115.

Figure 2:
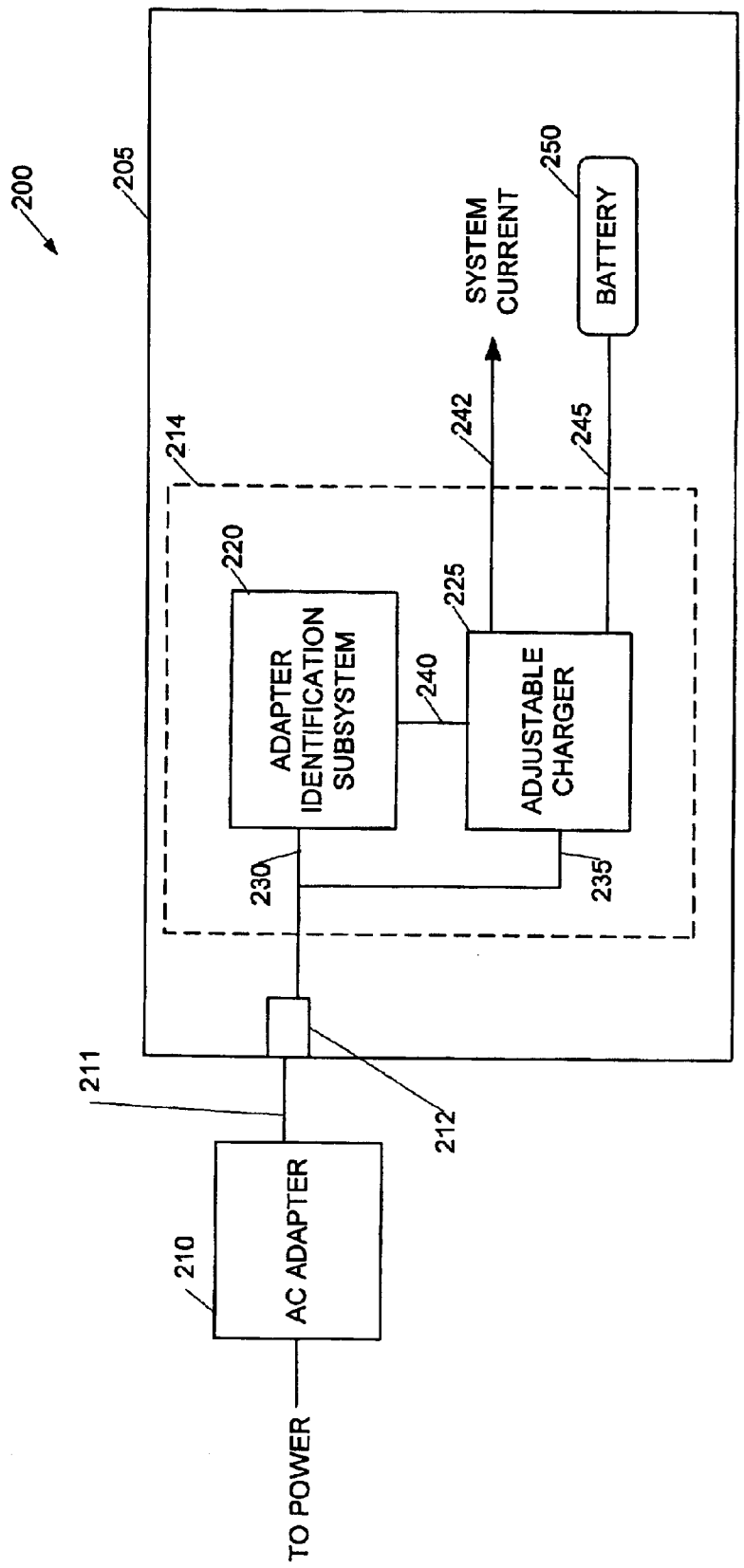
FIG. 2 is a block diagram illustrating a battery charger in accordance with one embodiment of the present invention.

FIG. 2 illustrates a block diagram of an exemplary battery charging system in accordance with an embodiment of the present invention. This exemplary battery charging subsystem may be used to charge a battery based upon characteristics of an AC adapter.

As illustrated in FIG. 2, AC adapter 210 is coupled to a power source (not shown) and to portable information handling system 205, which is similar to the portable information handling system 105 of FIG. 1. The portable information handling system 205 includes a battery charger 214 for determining the power rating of the AC adapter 210 and for providing current to power the portable information handling system 205 and/or to charge a battery 250 coupled to the portable information handling system 205. The AC adapter 210 may be one of multiple adapters capable of providing power to the portable information handling system 205. When the AC adapter 210 is coupled to the portable information handling system 205 and to the power source, the battery charger 214 determines the system current 242 necessary to power the information handling system 205. Additionally, the battery charger 214 determines whether an excess current exists beyond that needed to power the portable information handling system 205, and if so, provides the excess current 245 for charging battery 250. Since many AC adapters which are capable of providing power to portable information handling system 205 may not have the same output power rating, it may be beneficial to be able to dynamically determine AC adapter's maximum power rating and subsequently maximize the excess current, 245, to battery 250 based upon this dynamic determination. Advantageously, a maximum excess charge current may be provided to charge battery 250 while the possibilities of drawing more current than the AC adapter 210 is capable of providing are greatly reduced.

Continuing with FIG. 2, AC adapter 210 is coupled to battery charger 214 via link 211, AC adapter input port 212 and link 230. Links 211 and 230 as shown are a conceptual representation of the connection of AC adapter 210 to battery charger 214 through AC adapter input port 212. Physically, links 211 and 230 may be any form (for example a power cord and/or an electrical connection on a system board) to electrically couple AC adapter 210 to battery charger 214. AC adapter 210 is also coupled to adjustable charger 225 via link 235, which is similar to link 230.

Battery charger 214 includes adapter identification subsystem 220 and adjustable charger 225. The adapter identification subsystem 220 is coupled via link 240 to adjustable charger 225. Adapter identification subsystem 220, described subsequently with reference to FIGS. 3 and 4, determines the power rating of adapter 210 and provides this information to adjustable charger 225 via an adjusting current. The adjustable charger 225, described subsequently with reference to FIG. 5, uses the power rating to provide the maximum excess battery current 245 to charge battery 250.

Advantageously, providing a maximum power for charging a battery based on detection of an AC adapter may result in a decreased charge time for battery 250 which in turn, may lead to longer use of portable information handling system 205.

Figure 3:
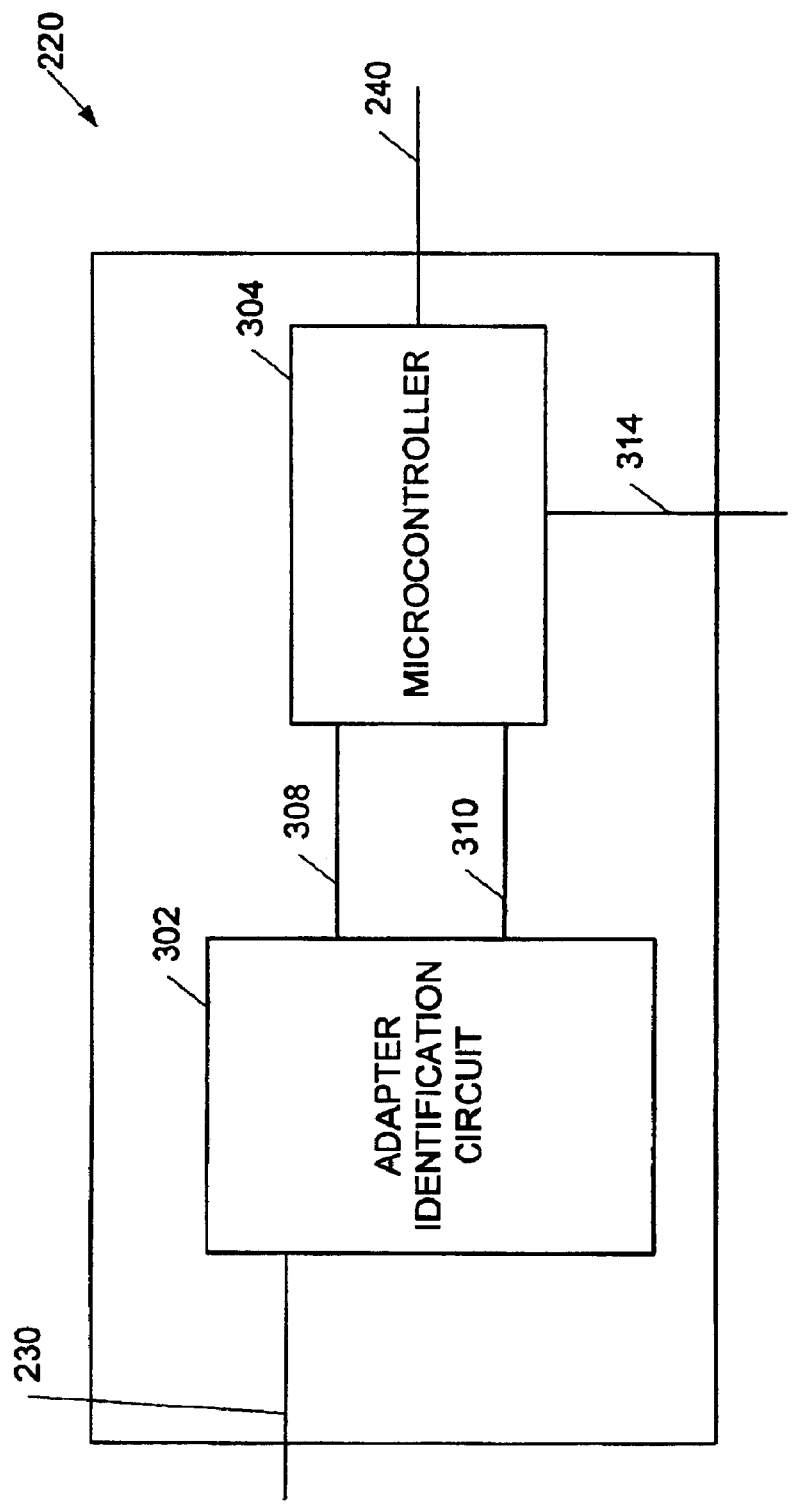
FIG. 3 is a block diagram illustrating an adapter identification subsystem in accordance with an embodiment of the present invention.

FIG. 3 illustrates an adapter identification subsystem in accordance with one embodiment of the present invention. Adapter identification subsystem 220 includes adapter identification circuit 302 coupled to microcontroller 304 via links 308 and 310. Link 230 is coupled to an AC adapter input port, for example AC adapter input port 212. Adapter identification circuit 302 reads signal 230 and determines an adapter identification code. The adapter identification code is used to provide information about the power rating of AC adapter 210 and is provided to microcontroller 304 via links 308 and 310. From the adapter identification code, and other inputs provided to microcontroller 304 through link 314 from portable information handling system 205, microcontroller 304 calculates an adjusting current used by adjustable charger 225 to calculate the maximum excess battery current 245 to charge battery 250. The adjusting current is provided on link 240.

Figure 4:
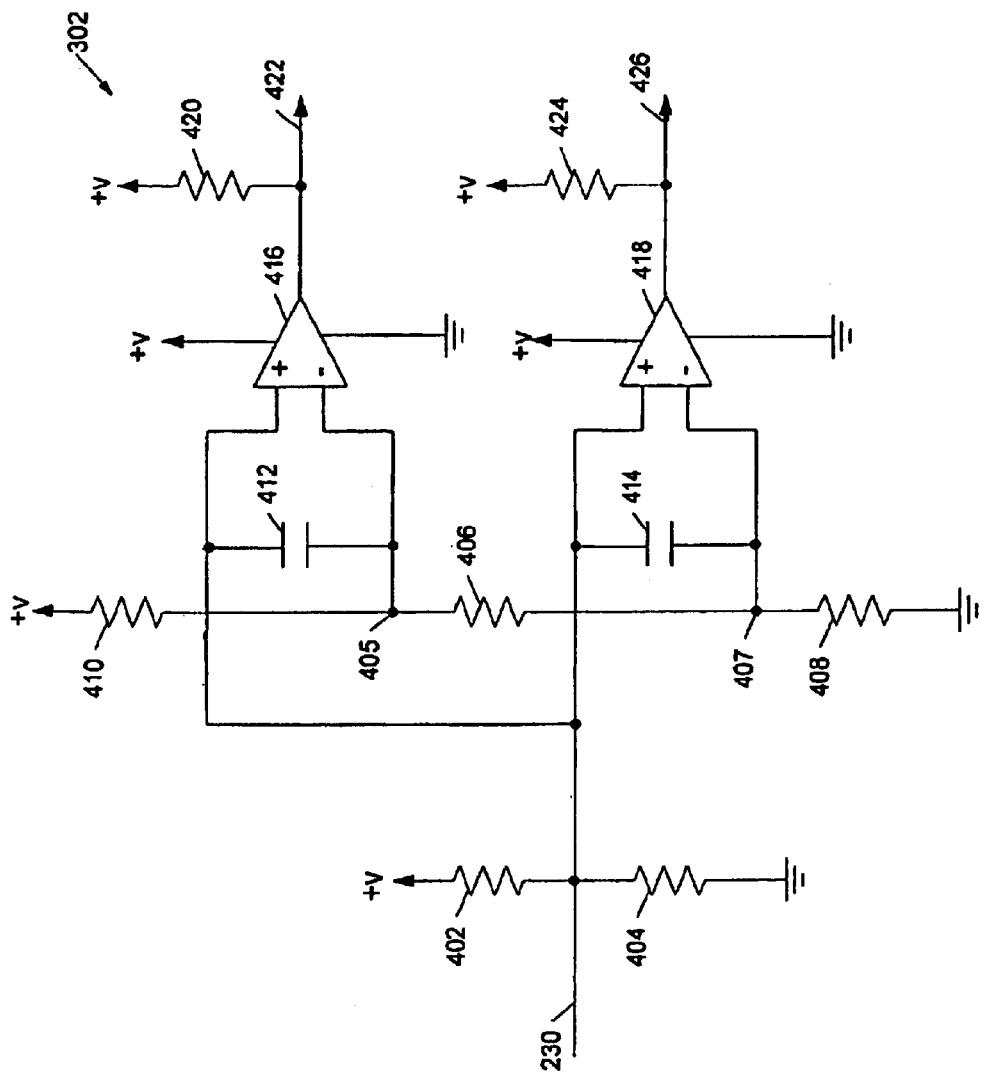
FIG. 4 is a schematic diagram illustrating an adapter identification circuit for use in accordance with another embodiment of the present invention.

FIG. 4 illustrates an exemplary adapter identification circuit 302 for use in portable information handling system 205 according to one embodiment of the present invention. Input signal 230 is received from the AC adapter 210 via AC adapter input port 212 of FIG. 2 to provide identification of the power rating of AC adapter 210. Input signal 230 may be one of three values: high, low or floating, where the voltage level of floating is equal to one-half of the voltage level (the voltage level is designated as +V in FIG. 5). However, one of ordinary skill in the art will recognize that values other than high, low or floating may be used and/or more or less number of signal values may be used. For example, one embodiment may provide only high and low, or ½ high and ½ low. Additionally, the various methods of implementation described above apply equally to the circuit of FIG. 4, which may be implemented in various hardware, e.g. programmable gate array, or software forms, e.g. microcode in a microcontroller.

Continuing with FIG. 4, a comparison is made between the voltage input of input signal 230 and a given voltage in order to provide an adapter identification code. Comparator 416 compares the voltage of input signal 230 with the voltage at point 405. In one embodiment, the voltage at 405 is $\frac{2}{3}(V)$, however the voltage may be any known voltage to compare with signal 230. Comparator 416 will output a "1" on signal line 422 if the voltage of input signal 230 is greater than the voltage at point 405, and will output a "0" otherwise.

Similarly, comparator 418 compares the voltage of input signal 230 with the voltage at point 407. In one embodiment, the voltage at 407 is $\frac{1}{3}(V)$, however the voltage may be any known voltage to compare with signal 230. Comparator 418 will output a "1" on signal line 426 if the voltage of input signal 230 is greater than the voltage at point 407, and will output a "0" otherwise. The output of comparators 416 and 418 represents the adapter identification code for a given adapter, and is provided on signals 422 and 426 respectively.

Embodiments of the present invention are not limited to the exemplary adapter identification circuit of FIG. 3. Other methods may be used to identify the power rating of the AC adapter 210. For example, additional hardware identification circuits may be used to detect the power rating of the AC adapter 210. Alternatively, or in addition, software may be used to obtain the power characteristics of AC adapter 210.

Figure 5:
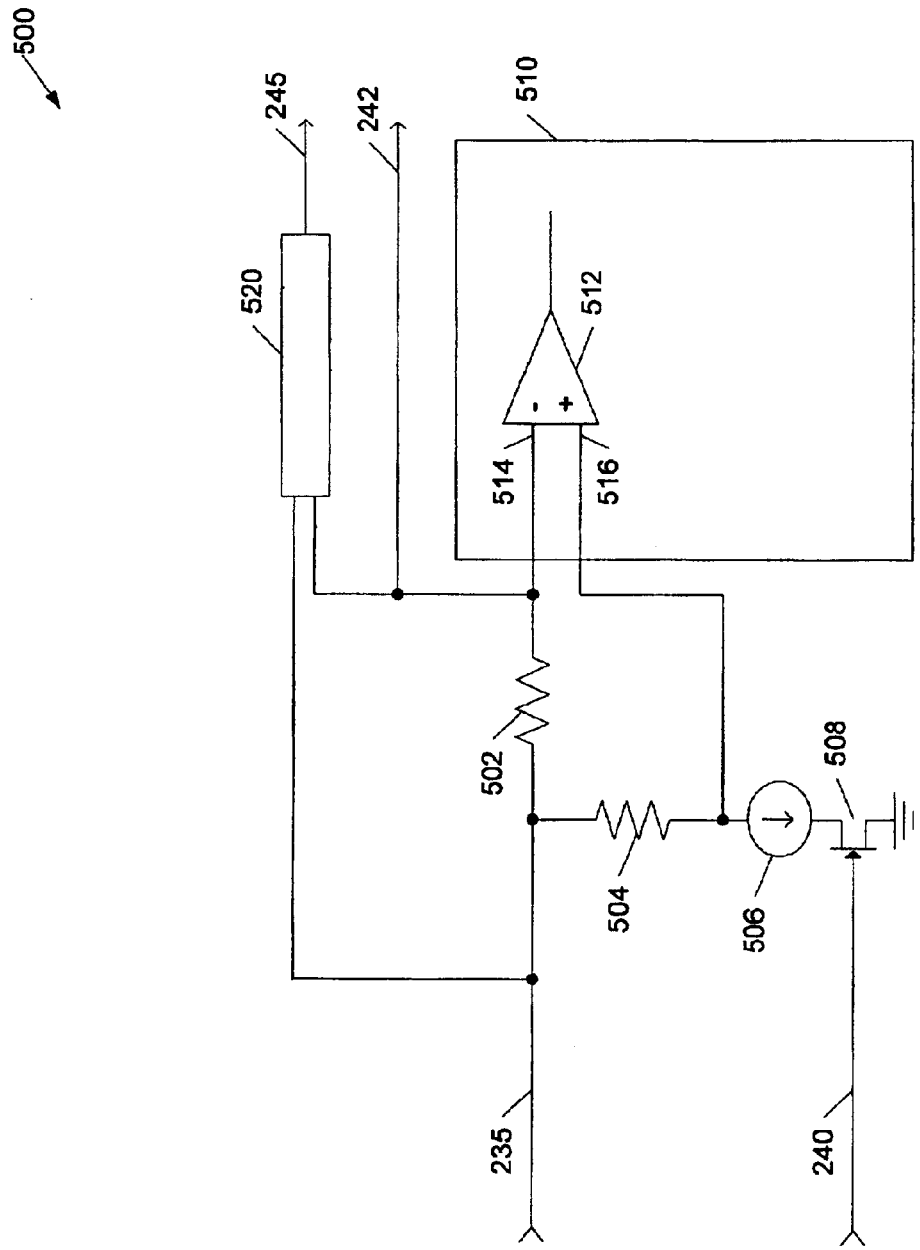
FIG. 5 illustrates a power adjustment circuit in accordance with one embodiment of the present invention.

FIG. 5 illustrates an exemplary power adjustment circuit for use with an adjustable charger 225 in accordance with one embodiment of the present invention. The power adjustment circuit monitors the system current and adjusts the battery charge current accordingly. For example, if the amount of system current has decreased since the last monitor, the power adjustment circuit may increase the battery charge current.

Power adjustment circuit 500 is used to adjust the amount of power for charging a battery in an information system based upon the amount of power provided to the information system by one of a variety of power adapters. At any given time, the amount of system current provided to portable information handling system 205 is measured across resistor 502. Input signal 235 represents the power supplied by AC adapter 210, while input signal 240 provides the adjusting current provided by adapter identification subsystem 220.

Power adjustment circuit 500 dynamically changes the system current and battery charging current based upon the power supplied by an AC adapter, for example the AC adapter 210 of FIG. 2. The adjusting current on signal 240 operates to control JFET 508 to adjust system current 242. The system current 242 is feed into subtracting circuit 520 to calculate battery charging current 245. Battery charging current 245 is calculated by subtracting the system current from the adapter current. The system current is the amount of current needed by the system at any given time, while the adapter current is the amount of current provided by an the AC adapter.

The preceding examples are included to demonstrate specific embodiments of the invention. It should be appreciated by those of skill in the art that the techniques disclosed represent techniques discovered by the inventor to function well in the practice of the invention, and thus can be considered to constitute preferred modes for its practice. However, it should be understood that the invention is not intended to be limited to the particular forms disclosed. Rather, the different aspects of the disclosed compositions and methods may be utilized in various combinations and/or independently. Those of skill in the art should, in light of the present disclosure, appreciate that many changes can be made in the specific embodiments which are disclosed and still obtain a like or similar result without departing from the spirit and scope of the invention, as defined by the appended claims.

What is claimed is:

1. An information handling system comprising:

a processor;

a battery operable to provide power to the processor;

an AC adapter input port configured to receive an AC adapter, wherein the AC adapter provides current thereto and a signal specifying a maximum current capacity of the AC adapter;

a battery charger coupled to the battery and the AC adapter input port, wherein the battery charger is configured to
provide a battery charge current to the battery,
determine the maximum current capacity of the AC adapter from the signal, and
set the amount of the battery charge current based upon the maximum current capacity of the AC adapter;

an AC adapter identification subsystem coupled to the AC adapter input port, wherein the adapter identification subsystem is configured to identify the maximum current capacity of the AC adapter from the signal and provide an adjustment current based thereon; and an adjustable charger coupled to the adapter identification subsystem and the battery, wherein the adjustable charger is configured to adjust the battery charge current based upon the adjustment current.

2. The information handling system of claim 1, wherein the AC adapter identification subsystem comprises:

an adapter identification circuit coupled to the AC adapter input port, wherein the adapter identification circuit is configured to identify the maximum current capacity from the signal; and a microcontroller coupled to the adapter identification circuit and the adjustable charger, wherein the microcontroller is configured to provide the adjustment current to the adjustable charger.

3. The information handling system of claim 2, wherein the adapter identification circuit comprises a comparator coupled to the AC adapter input port and the microcontroller, wherein the identification circuit is configured to compare the signal with a first and a second predetermined value and provide a first and a second output to the microcontroller.

4. The information handling system of claim 3, wherein:

the signal is represented by a voltage level;

the first and second outputs are at logic 1 when the voltage level is at a system voltage;

the first and second outputs are at logic 0 when the voltage level is at zero volts, and the first output is at logic 0 and the second output is at logic 1 when the voltage level is between zero volts and the system voltage.

5. The information handling system of claim 1, wherein the adjustable charger comprises:

an input configured to receive an AC adapter current from the AC adapter port;

a current source coupled to a microcontroller, wherein the current source is configured to adjust a system current based upon the adjustable current;

a measuring circuit coupled to the AC adapter input port, wherein the measuring circuit is configured to measure a system current; and a subtracting circuit coupled to the battery and the measuring circuit, wherein the subtracting circuit is configured to provide the battery charge current based upon the difference between the system current and the AC adapter maximum current capacity.

6. A battery charger for charging a battery in an information handling system, the battery charger comprising:

an adapter identification subsystem configured to identify a signal level representative of a maximum current capacity of an AC adapter, wherein the adapter identification subsystem is configured to provide an adjustment current to the adjustable charger based on the signal level; and an adjustable charger comprising an input configured to receive an AC adapter current from an AC adapter input port, a current source coupled to a microcontroller, wherein the current source is configured to adjust a system current based upon the adjustment current, a measuring circuit coupled to the AC adapter input port, wherein the measuring circuit is configured to measure a system current, and a subtracting circuit coupled to the battery and the measuring circuit, wherein the subtracting circuit is configured to provide the battery charge current based upon the difference between the system current and the maximum current capacity of the AC adapter;

wherein the adjustable charger is coupled to the adapter identification subsystem and is configured to set a battery charge current based upon the signal level representative of the maximum current capacity of the AC adapter.

7. The battery charger of claim 6, wherein the adapter identification subsystem comprises:

an adapter identification circuit coupled to the AC adapter input port, wherein the adapter identification circuit is configured to identify the signal level; and a microcontroller coupled to the adapter identification circuit and the adjustable charger, wherein the microcontroller is configured to provide the adjustment current to the adjustable charger.

8. The battery charger of claim 7, wherein the adapter identification circuit comprises a comparator coupled to the AC adapter input port and the microcontroller, wherein the adapter identification circuit is configured to compare the signal level with a first and a second predetermined value and provide a first and a second output to the microcontroller.

9. The battery charger of claim 8, wherein:

the signal level is a voltage level;

the first and the second outputs are at logic 1 when the voltage level is at a system voltage;

the first and the second outputs are at logic 0 when the voltage level is at zero volts, and the first output is at logic 0 and the second output is at logic 1 when the voltage level is between zero volts and the system voltage.

* * * * *